United States Patent
Kang et al.

(10) Patent No.: US 9,695,803 B2
(45) Date of Patent: Jul. 4, 2017

(54) WIND DIRECTION ADJUSTABLE BLADE TYPE VERTICAL AXIS WIND TURBINE

(76) Inventors: Ok Rye Kang, Changwon-si (KR); Meong Jin Shin, Changwon-si (KR); Meong Cheol Shin, Changwon-si (KR); Hyun Dai Yang, Changwon-si (KR)

( * ) Notice: Subject to any disclaimer, the term of this patent is extended or adjusted under 35 U.S.C. 154(b) by 801 days.

(21) Appl. No.: 13/882,577

(22) PCT Filed: Oct. 26, 2011

(86) PCT No.: PCT/KR2011/008015
§ 371 (c)(1),
(2), (4) Date: Jul. 10, 2013

(87) PCT Pub. No.: WO2012/060570
PCT Pub. Date: May 10, 2012

(65) Prior Publication Data
US 2013/0280034 A1    Oct. 24, 2013

(30) Foreign Application Priority Data
Nov. 5, 2010  (KR) .................. 10-2010-0109606

(51) Int. Cl.
F03D 7/06 (2006.01)
F03D 3/06 (2006.01)
F03D 3/02 (2006.01)
F03D 80/70 (2016.01)

(52) U.S. Cl.
CPC ............ *F03D 7/06* (2013.01); *F03D 3/02* (2013.01); *F03D 3/064* (2013.01); *F03D 3/068* (2013.01); *F03D 80/70* (2016.05); *F05B 2260/72* (2013.01); *Y02E 10/74* (2013.01)

(58) Field of Classification Search
CPC ... F03D 7/06; F03D 3/068; F03D 3/02; F03D 11/0008; F03D 3/064; F03D 80/70; Y02E 10/74; F05B 2260/72
See application file for complete search history.

(56) References Cited
U.S. PATENT DOCUMENTS

| | | | | |
|---|---|---|---|---|
| 987,645 | A | * | 3/1911 | Otoole ...................... F03D 3/00 416/17 |
| 994,765 | A | * | 6/1911 | Manning ................... F03D 3/00 416/118 |

(Continued)

*Primary Examiner* — Craig Kim
*Assistant Examiner* — Eldon Brockman
(74) *Attorney, Agent, or Firm* — John K. Park; Park Law Firm

(57) ABSTRACT

The present invention relates to a wind direction adjustable blade type vertical axis wind turbine that is configured to allow blades to be automatically swung, thereby making more efficient use of wind power. The wind turbine includes: a rotating shaft adapted to be rotated by means of wind power; an upper plate adapted to be coupled to the upper portion of the rotating shaft; a lower plate adapted to be coupled to the lower portion of the rotating shaft; a plurality of blades disposed between the upper plate and the lower plate; and swing motion units disposed between the top end of each blade and the upper plate and between the underside end of each blade and the lower plate in such a manner as to form the center of rotation of each blade, while allowing each blade to be rotatable in accordance with the wind direction.

4 Claims, 13 Drawing Sheets

(56) References Cited

U.S. PATENT DOCUMENTS

| | | | | |
|---|---|---|---|---|
| 1,465,593 A * | 8/1923 | Barrett | F03D 3/068 | 416/109 |
| 4,037,989 A * | 7/1977 | Huther | F03D 3/061 | 416/197 A |
| 4,383,801 A * | 5/1983 | Pryor | F03D 3/068 | 416/119 |
| 4,496,283 A * | 1/1985 | Kodric | F03D 3/067 | 416/119 |
| 5,324,164 A * | 6/1994 | Doering | F03B 17/067 | 415/150 |
| 6,320,273 B1 * | 11/2001 | Nemec | F03D 3/005 | 290/43 |
| 7,083,382 B2 * | 8/2006 | Ursua | F03B 17/065 | 416/110 |
| 7,258,527 B2 * | 8/2007 | Shih | B63H 9/00 | 415/4.2 |
| 7,614,976 B2 * | 11/2009 | Smook | F03D 11/02 | 475/331 |
| 7,618,237 B2 * | 11/2009 | Lucas | F03D 3/067 | 416/119 |
| 7,855,468 B2 * | 12/2010 | Lin | F03B 17/065 | 290/43 |
| 8,016,544 B1 * | 9/2011 | Nguyen | F03D 3/067 | 415/130 |
| 2003/0185666 A1 * | 10/2003 | Ursua | F03B 17/065 | 415/4.2 |
| 2004/0228729 A1 * | 11/2004 | Migler | F03D 3/067 | 416/119 |
| 2007/0142156 A1 * | 6/2007 | Smook | F03D 11/02 | 475/166 |
| 2008/0199314 A1 * | 8/2008 | Lucas | F03D 3/067 | 416/9 |
| 2011/0172048 A1 * | 7/2011 | Nishida | F03D 11/0008 | 475/159 |
| 2011/0175363 A1 * | 7/2011 | Pischel | F03D 11/02 | 290/55 |
| 2011/0211960 A1 * | 9/2011 | Nguyen | F03D 3/067 | 416/147 |

* cited by examiner

WIND DIRECTION ADJUSTABLE BLADE TYPE VERTICAL AXIS WIND TURBINE

BACKGROUND OF THE INVENTION

Field of the Invention

The present invention relates to a wind direction adjustable blade type vertical axis wind turbine that is configured to allow blades to be automatically swung, thereby making more efficient use of wind power.

Background of the Related Art

Generally, a wind turbine is a device that converts wind energy into mechanical energy, having a plurality of blades rotatably disposed by means of wind to transmit the rotary force to other machinery.

On the other hand, the wind turbine is connected to a transmission, generating unit and the like to constitute a wind power generator, thereby producing electricity. In accordance with the directions of the rotating shafts of blades, the wind turbine is classified into a vertical axis wind turbine having the rotating shafts mounted vertically with respect to the ground and a horizontal shaft wind turbine having the rotating shafts mounted horizontally with respect to the ground.

In this case, the vertical axis wind turbine can be advantageously used irrespective of wind direction, but may generate the resistance caused by the blades during the rotation of the blades, thereby providing relatively lower efficiencies than the horizontal axis wind turbine.

That is, if the blades are rotated, some of them are rotated in the forward direction with respect to the wind direction, thereby generating the rotary force therefrom, but others are rotated in the backward direction with respect to the wind direction, thereby causing the rotational resistance therefrom to prevent the rotary force from being effectively generated.

SUMMARY OF THE INVENTION

Accordingly, the present invention has been made in view of the above-mentioned problems occurring in the prior art, and it is an object of the present invention to provide a wind direction adjustable blade type vertical axis wind turbine that allows blades to be automatically swung to increase the resistance of wind in a forward direction and to decrease the resistance of wind in a backward direction in accordance with the rotational positions of the wind turbine and the wind directions, thereby improving the generating efficiency.

It is another object of the present invention to provide a wind direction adjustable blade type vertical axis wind turbine that allows blades to be fixed rotatably to a given angle.

To accomplish the above objects, according to the present invention, there is provided a wind direction adjustable blade type vertical axis wind turbine including: a rotating shaft adapted to be rotated by means of wind power; an upper plate adapted to be coupled to the upper portion of the rotating shaft; a lower plate adapted to be coupled to the lower portion of the rotating shaft; a plurality of blades disposed between the upper plate and the lower plate; and swing motion units disposed between the top end of each blade and the upper plate and between the underside end of each blade and the lower plate in such a manner as to form the center of rotation of each blade to allow each blade to be rotatable to left and right sides in accordance with wind direction, wherein each swing motion unit includes: a first body adapted to be fixed to the upper plate or the lower plate; and a second body adapted to be fixed to each blade in such a manner as to be rotatably coupled engagedly to the first body, the first body and the second body having stoppers formed protrudingly therefrom in the opposite direction to each other in such a manner as to interfere with each other at the time when the blade is rotated, thereby restricting the rotating range and transmitting the wind power provided to the blade to the rotating shaft.

According to the present invention, desirably, the plurality of blades is located in such a manner as to prevent arbitrary lines made by connecting the centers of rotation of the blades and the center of the rotating shaft from crossing each other.

According to the present invention, desirably, each blade has a shape of an arc and includes: a collection portion formed on one side surface thereof to collect the wind power; an avoidance portion formed on the other side surface thereof in such a manner as to reduce the resistance against the wind power; and a plurality of furring portions formed at the inside of the collection portion in such a manner as to be fastened to the swing motion units and to rigidly maintain the shape of each blade.

According to the present invention, desirably, each swing motion unit includes: the first body adapted to be fixed to a first object and having a coupling portion protruded therefrom; a second body adapted to be fixed to a second object in such a manner as to be rotatably coupled to the first body around the coupling portion by means of a coupling hole formed to correspond to the coupling portion of the first body; a main fixing shaft provided to be passed through the first object and the coupling portion of the first body and through the second object and the coupling hole of the second body, on a portion thereof, to form the center of rotation of any one of the first object and the second object; first body fixing shafts adapted to be passed on the end portions thereof through the first object and to be fixed to the outside of the first object by means of fastening members, in the state of being partially inserted into fixing holes formed on the first body; second body fixing shafts adapted to be passed on the end portions thereof through the second object and to be fixed to the outside of the second object by means of fastening members, in the state of being partially inserted into fixing holes formed on the second body; and the stoppers formed protrudingly from the first body and the second body in the opposite direction to each other in such a manner as to restrict the rotating range during the rotation of the first object or the second object.

According to the present invention, desirably, each first body fixing shaft includes: a first body fixing shaft head portion adapted to be inserted into the fixing holes formed on the first body; and a first body fixing shaft body portion adapted to be passed through the first body and the first object in such a manner as to be exposed to the outside, and each second body fixing shaft includes: a second body fixing shaft head portion adapted to be inserted into the fixing holes formed on the second body; and a second body fixing shaft body portion adapted to be passed through the second body and the second object in such a manner as to be exposed to the outside.

According to the present invention, desirably, the first body further includes a bearing mounted along the coupling portion to reduce the frictional resistance between the first body and the second body.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, an explanation on a wind direction adjustable blade type vertical axis wind turbine according to the preferred embodiments of the present invention will be in detail given with reference to the attached drawing. However, the explanation on the specific structure and functions are given just to define the preferred embodiments of the present invention, and the preferred embodiments of the present invention may be provided in various manners, which are not limited to the embodiments described below.

Figure 1:
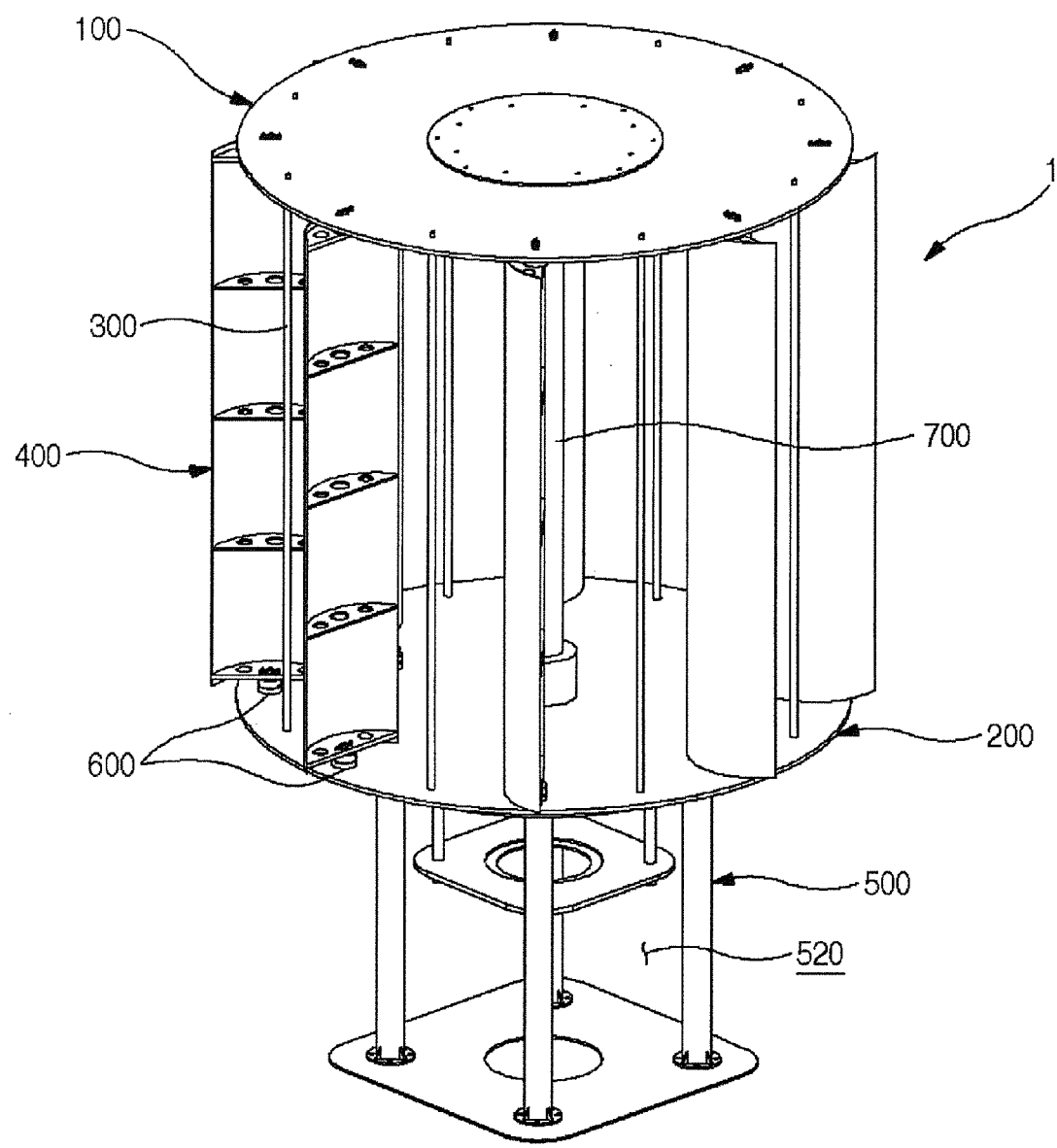
FIG. 1 is a perspective view showing a wind direction adjustable blade type vertical axis wind turbine according to a first embodiment of the present invention.
Figure 2:
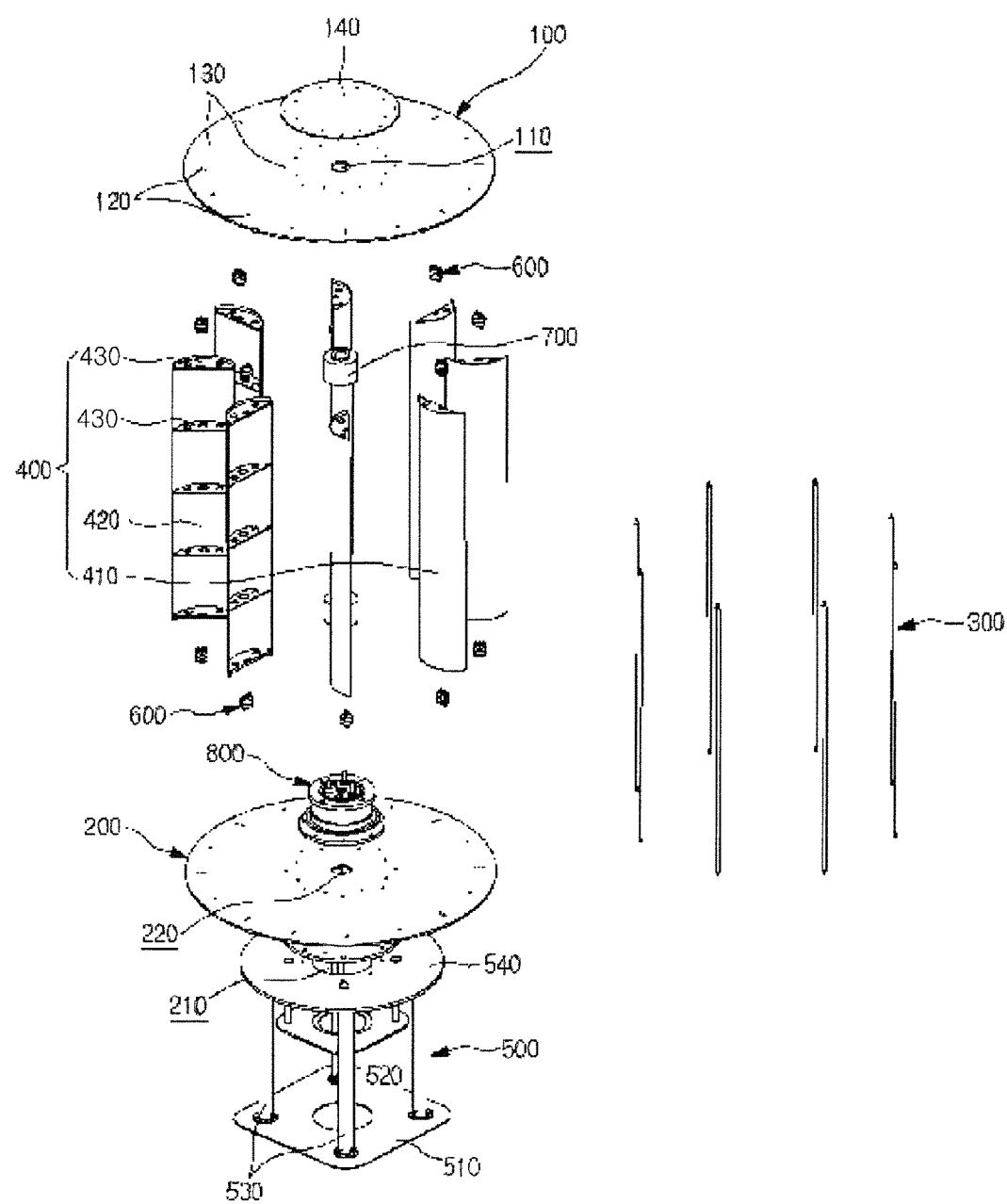
FIG. 2 is an exploded perspective view of FIG. 1.

FIG. 1 is a perspective view showing a wind direction adjustable blade type vertical axis wind turbine according to a first embodiment of the present invention, and FIG. 2 is an exploded perspective view of FIG. 1.

Referring to FIGS. 1 and 2, a wind direction adjustable blade type vertical axis wind turbine 1 (which is simply referred to as 'wind turbine') according to a first embodiment of the present invention includes: a rotating shaft 700 adapted to be rotated by means of wind power; an upper plate 100 adapted to be coupled to the upper portion of the rotating shaft 700; a lower plate 200 adapted to be coupled to the lower portion of the rotating shaft 700; one or more blades 400 disposed between the upper plate 100 and the lower plate 200 and adapted to be coupled to at least one or more sides of the upper plate 100 and the lower plate 200 by means of swing motion units 600 in such a manner as to be rotatable around the center shafts of the rotation of the swing motion units 600 in accordance with the wind direction; and a generating unit (not shown) connected to the rotating shaft 700.

In more detail, the upper plate 100 has a shape of a generally circular plate and is adapted to fix the top sides of the blades 400 thereto in such a manner as to allow the fixed blades 400 to be individually rotatable.

Accordingly, the upper plate 100 has blade top surface fixing portions 120 having a plurality of holes pierced therethrough, and the number of the blade top surface fixing portions 120 is the same as the number of the blades 400. That is, the blades 400 are individually rotatable in the state of being fixed to the upper plate 100 and the lower plate 200 as will be in detail described.

In the same manner as above, the lower plate 200 has blade underside surface fixing portions 220 formed thereon and has the size and shape corresponding to those of the upper plate 100.

Further, the rotating shaft 700 is mounted through the center portion of the upper plate 100.

So as to do such mounting, the upper plate 100 has an upper center hole 110 pierced in the middle portion thereof, and the lower plate 200 has a lower center hole 210 pierced in the middle portion thereof. Further, the upper plate 100 has a cover 140 adapted to close the upper center hole 110.

The rotating shaft 700 is connected to a mechanical unit like the generating unit in such a manner as to transmit the wind power generated by means of the blades 400 to the mechanical unit, thereby allowing the wind power to be used as the power for generation or other mechanical units.

In the embodiments as will be described below, the rotating shaft 700 of the wind turbine 1 according to the present invention is connected to the generating unit, thereby producing electricity, but if necessary, the rotating shaft 700 may be connected to a variety of units inclusive of pumps requiring a rotating force.

Further, the wind turbine 1 according to the present invention includes an accelerating unit 800 adapted to increase the rotating force of the rotating shaft 700, thereby more rapidly generating the revolutions per minute. The accelerating unit 800 has a plurality of planet gear trains, which will be in detail explained with reference to the drawing.

On the other hand, the wind turbine 1 according to the present invention has the swing motion units 600 adapted to allow the wind collecting directions of the blades 400 to be varied in accordance with the wind direction. The swing motion units 600 are disposed on the top and underside portions of each blade 400 and limit the rotating angles of the blades 400 to decrease the rotational resistance in accordance with the wind direction.

Further, each blade 400 has a shape of an arc and includes a collection portion 420 formed on one side surface thereof to collect wind power and an avoidance portion 410 formed on the other side surface thereof in such a manner as to reduce the resistance against the wind power.

That is, the collection portion 420 is relatively concaved to easily collect the wind thereinto, and the avoidance portion 410 as the back surface of the collection portion 420 is rounded to send the wind thereagainst.

Further, the collection portion 420 has a plurality of furring portions 430 formed at the inside thereof to provide the coupling positions to each swing motion unit 600. Each furring portion 430 has a shape of a flat plate contacted with the inner peripheral edge of the collection portion 420, and also, the furring portions 430 are arranged in parallel to each other to rigidly maintain the shape of each blade 400.

That is, the furring portions 430 are disposed at the top and bottom ends of the inner periphery of the collection portion 420, respectively, and also spaced apart from each other in parallel to each other between the top and bottoms ends of the collection portion 420. Accordingly, the upwardly and downwardly elongated blades 400 can be supported by means of the plurality of furring portions 430 and thus maintained in shape in more rigid manner.

Further, each blade 400 has swing motion unit mounting portions 440 formed on the furring portions 430 disposed at the top and bottom ends of the inner periphery of the collection portion 420. Each of the swing motion unit mounting portions 440 is formed of a plurality of holes through which a configuration for fixing the swing motion unit 600 and a configuration for forming the center of rotation of the swing motion unit 600 are passed.

Moreover, a plurality of connection frames 300 is mounted between the upper plate 100 and the lower plate 200.

The connection frames 300 allow the wind turbine to be more stably rotated to generate power therefrom, and each connection frame 300 is fixed at the top end thereof to the upper plate 100 and fixed at the underside end thereof to the lower plate 200.

On the other hand, a stand 500 is further disposed on the underside of the lower plate 200 to accommodate a mechanical unit like a generating unit thereinto.

The stand 500 includes a base plate 510 adapted to form a support area, a support plate 540 disposed distant by a given height from the base plate 510 to form an accommodating space of the mechanical unit like the generating unit thereinto, and support beams 530 adapted to connect the base plate 510 and the support plate 540.

Figure 3:
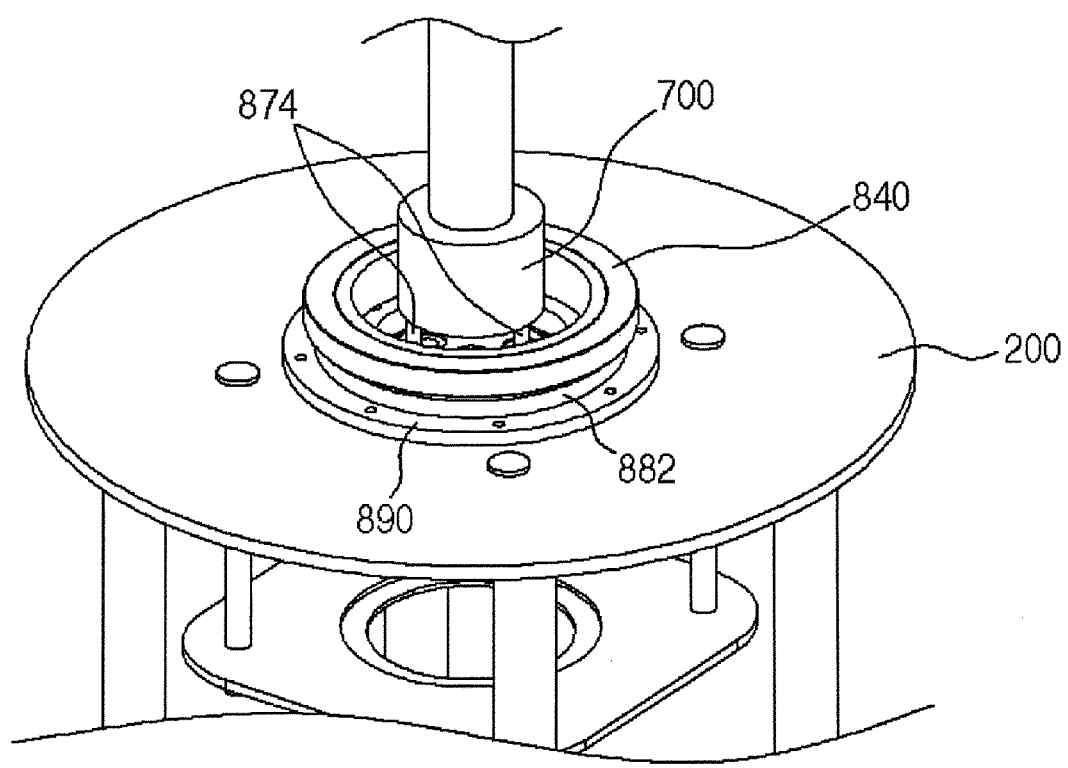
FIG. 3 is a perspective view showing the coupling relation between an accelerating unit and a rotating shaft as main components of the wind direction adjustable blade type vertical axis wind turbine according to the first embodiment of the present invention.
Figure 4:
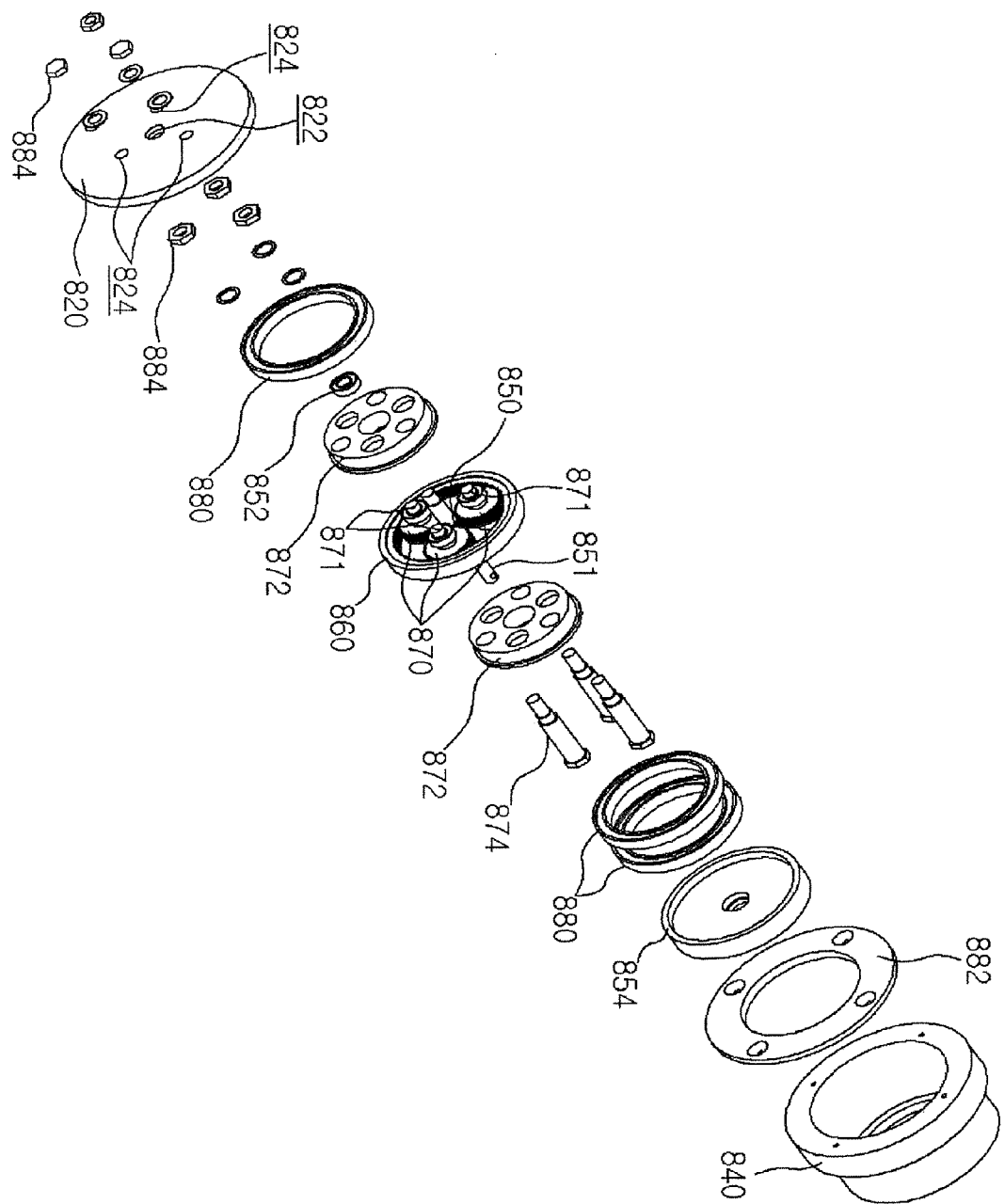
FIG. 4 is an exploded perspective view showing the detailed configuration of the accelerating unit of FIG. 3.

On the other hand, FIG. 3 is a perspective view showing the coupling relation between an accelerating unit and the rotating shaft as main components of the wind direction adjustable blade type vertical axis wind turbine according to the first embodiment of the present invention, and FIG. 4 is an exploded perspective view showing the detailed configuration of the accelerating unit of FIG. 3.

Referring to FIGS. 3 and 4, the accelerating unit 800 is coupled to the rotating shaft 700 by means of a connection rod and thus receives the rotary force from the rotating shaft 700. The received rotary force is accelerated by means of a plurality of planet gear trains provided at the inside of the accelerating unit 800.

In more detail, the accelerating unit 800 includes: a plate 820 rotatably fastened to the connection rod; a plurality of planet gears 870 rotated by receiving the rotary force of the plate 820; a sun gear 850 rotated among the planet gears 870 in such a manner as to be engaged with the planet gears 870 to transmit the rotary force to the generating unit; and a ring gear 860 disposed to surround the planet gears 870 in such a manner as to allow the planet gears 870 and the sun gear 850 to be rotated at a high speed at their fixed position.

In more detail, the plate 820 has a sun gear shaft receiving hole 822 adapted to receive a sun gear shaft 851 forming the center of rotation of the sun gear 850 and planet gear shaft receiving holes 824 adapted to receive a plurality of planet gear shafts 871 forming the centers of rotation of the planet gears 870.

On the other hand, the plate 820 is coupled to a body 840 to form the outer shape of the accelerating unit 800, and a main O-ring 882 is further disposed between the plate 820 and the body 840 to enhance the coupling force between the plate 820 and the body 840.

Further, the inner space formed by means of the body 840 and the plate 820 is provided with a plurality of components adapted to maintain the fixed positions of the ring gear 860, the planet gears 870 and the sun gear 850.

In more detail, gear shaft position fixing bushes 872 are provided on the back surface of the plate 820, through which the sun gear shaft 851 and the planet gear shafts 871 are passed.

That is, the gear shaft position fixing bushes 872 are adapted to allow the sun gear 850 and the planet gears 870 to be rotated in the state of being maintained at their given position, and they are disposed on the top and underside sides of the sun gear 860 and the planet gears 870 in such a manner as to be fixed to the plate 820 by means of bush fixing shafts 874.

In this case, the sun gear 860 and the planet gears 870 are accommodated into the gear shaft position fixing bushes 872, together with a sun gear shaft bearing 852 and planet gear shaft bearings (to which no reference numerals are applied), so that the gear shaft position fixing bushes 872 are rotated at the time of the rotation of the plate 820 to allow the planet gears 870 to be rotated by engaging the ring gear 860, and the rotation of the planet gears 870 is thus transmitted to the sun gear 850 engaged with the planet gears 870, thereby rotating the sun gear 850.

On the other hand, the ring gear 860 has a plurality of support rings 880 disposed at the inside thereof to maintain the fixed positions of the sun gear 860 and the planet gears 870. That is, the support rings 880 are located to surround the side peripheral portions of the planet gears 870, and the tooth form formed on the inner periphery of the ring gear 860 is engaged with the tooth forms formed on the outer peripheries of the planet gears 870. Further, the ring gear 860 is rotated as the positions of the planet gears 870 are varied by means of the rotation of the plate 820, and at this time, the planet gears 870 are rotated in the state of maintaining their given rotational paths.

In this case, an explanation on the gear structure for transmitting the rotary force of the plate 820 to the ring gear 860 will be in more detail given. First, the three planet gears 870, which are engaged with the tooth form formed on the inner periphery of the ring gear 860, are equally spaced apart from each other, while their outer peripheries are being connected to the ring gear 860.

Further, one sun gear 850 is disposed inside the three planet gears 870 equally spaced apart from each other, which is engaged with the three planet gears 870.

That is, the ring gear 860 having the largest gear ratio is engaged with the planet gears 870 having the gear ratio smaller than the ring gear 860 and thus accelerated in rotation. The sun gear 850 having the gear ratio smaller than the planet gears 870 is engaged with the planets gears 870 and thus accelerated again in rotation.

Next, the end portion of the sun gear shaft 851 is passed through a sun gear shaft bush 854 and the body 840 to transmit the accelerated rotary force to the generating unit.

On the other hand, an accelerating unit fixing member 890 is further provided between the lower plate 200 and the accelerating unit 800 to fix the accelerating unit 800 to the lower plate 200. The accelerating unit fixing member 890 accommodates the lower end of the body 840 of the accelerating unit 800 thereinto and fixes the accelerating unit 800 to the lower plate 200 by means of fastening members.

On the other hand, the swing motion units 600 are provided on the top and underside ends of each blade 400 and adapted to fix the corresponding blade 400 thereto in such a manner as to be rotatable to a given angle in accordance with wind direction.

Figure 5:
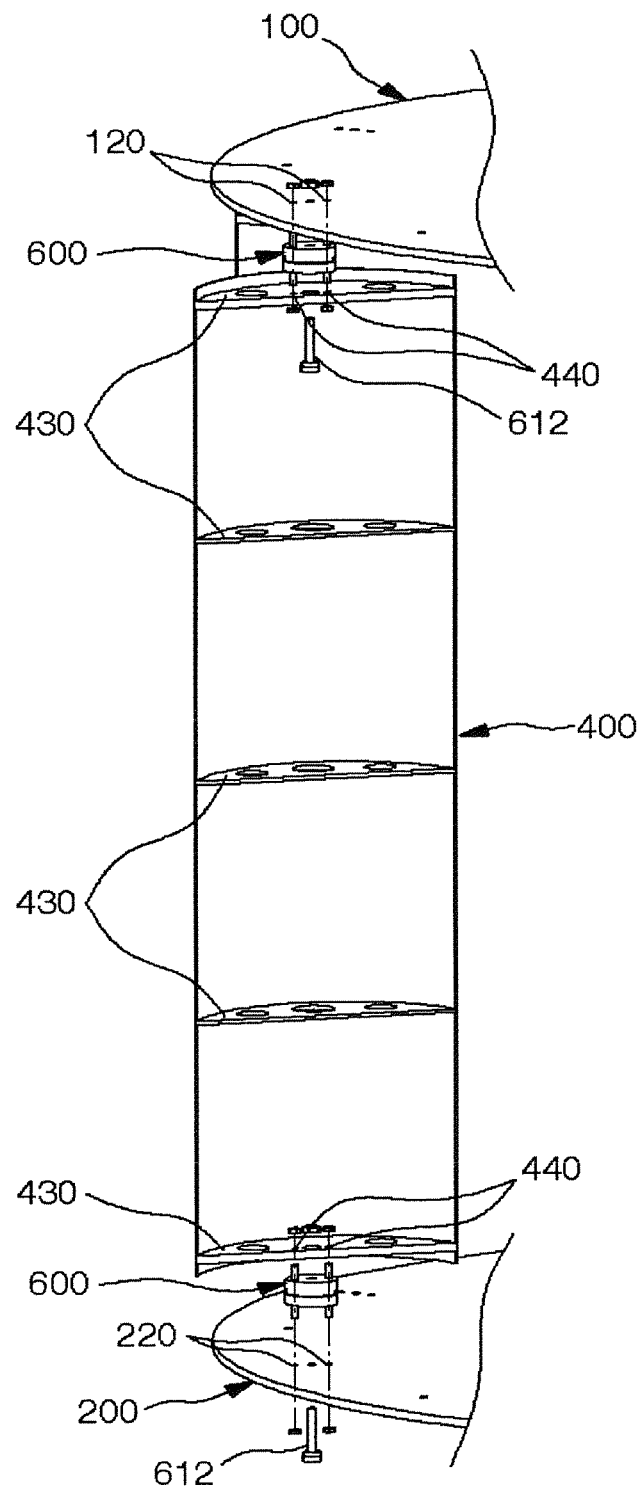
FIG. 5 is a perspective view showing the coupling relation between a blade and a swing motion unit for swinging the blade as main components of the wind direction adjustable blade type vertical axis wind turbine according to the first embodiment of the present invention.
Figure 6:
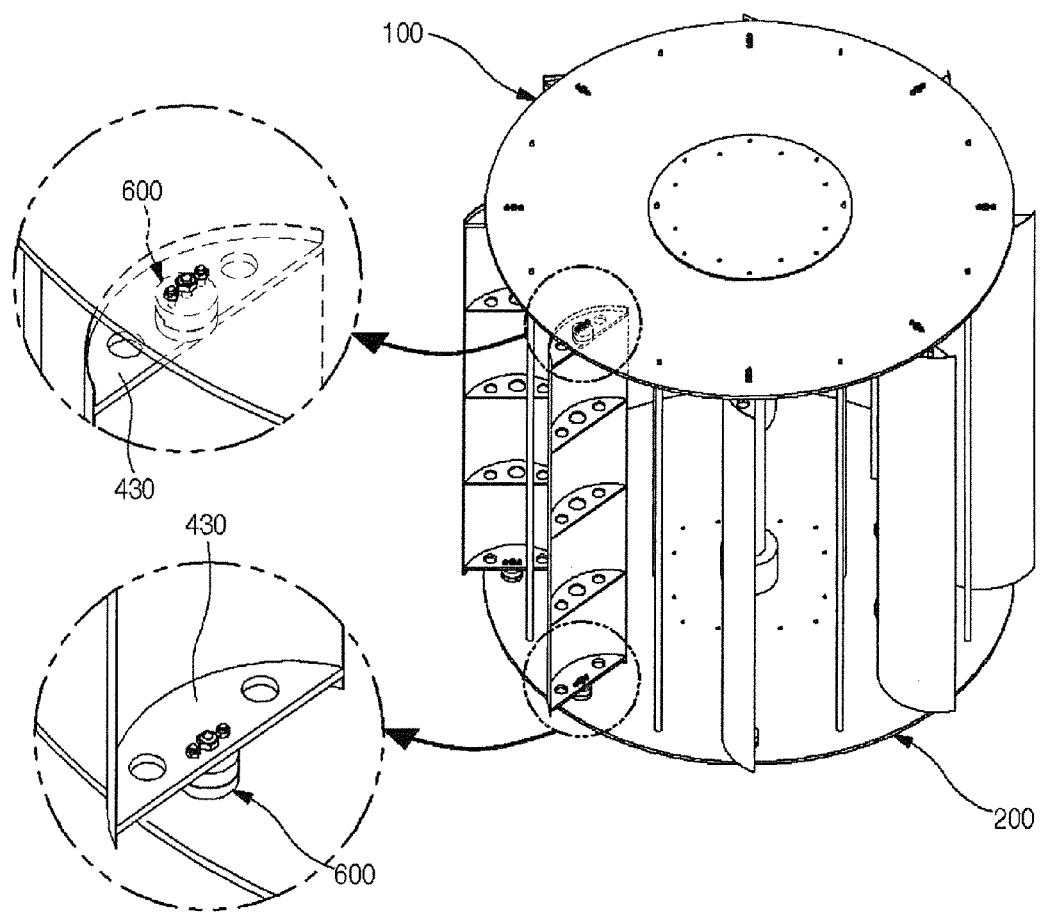
FIG. 6 is a perspective view showing the coupling state between the blade and the swing motion unit as main components of the wind direction adjustable blade type vertical axis wind turbine according to the first embodiment of the present invention.

FIG. 5 is a perspective view showing the coupling relation between the blade and the swing motion unit for swinging the blade as main components of the wind direction adjustable blade type vertical axis wind turbine according to the first embodiment of the present invention, and FIG. 6 is a perspective view showing the coupling state between the blade and the swing motion unit as main components of the wind direction adjustable blade type vertical axis wind turbine according to the first embodiment of the present invention.

Referring to FIGS. 5 and 6, the swing motion unit 600 adapted to rotatably fix the top of the blade 400 thereto is disposed between the upper plate 100 and the furring portion 430, and the swing motion unit 600 adapted to rotatably fix the underside of the blade 400 thereto is disposed between the lower plate 200 and the furring portion 430.

In the state of being fixed to the upper plate 100 and the lower plate 200 to which the plurality of blades 400 are fixed, that is, the swing motion units 600 enable the individual rotation of the blades 400 and further limit their rotational positions.

Figure 7:
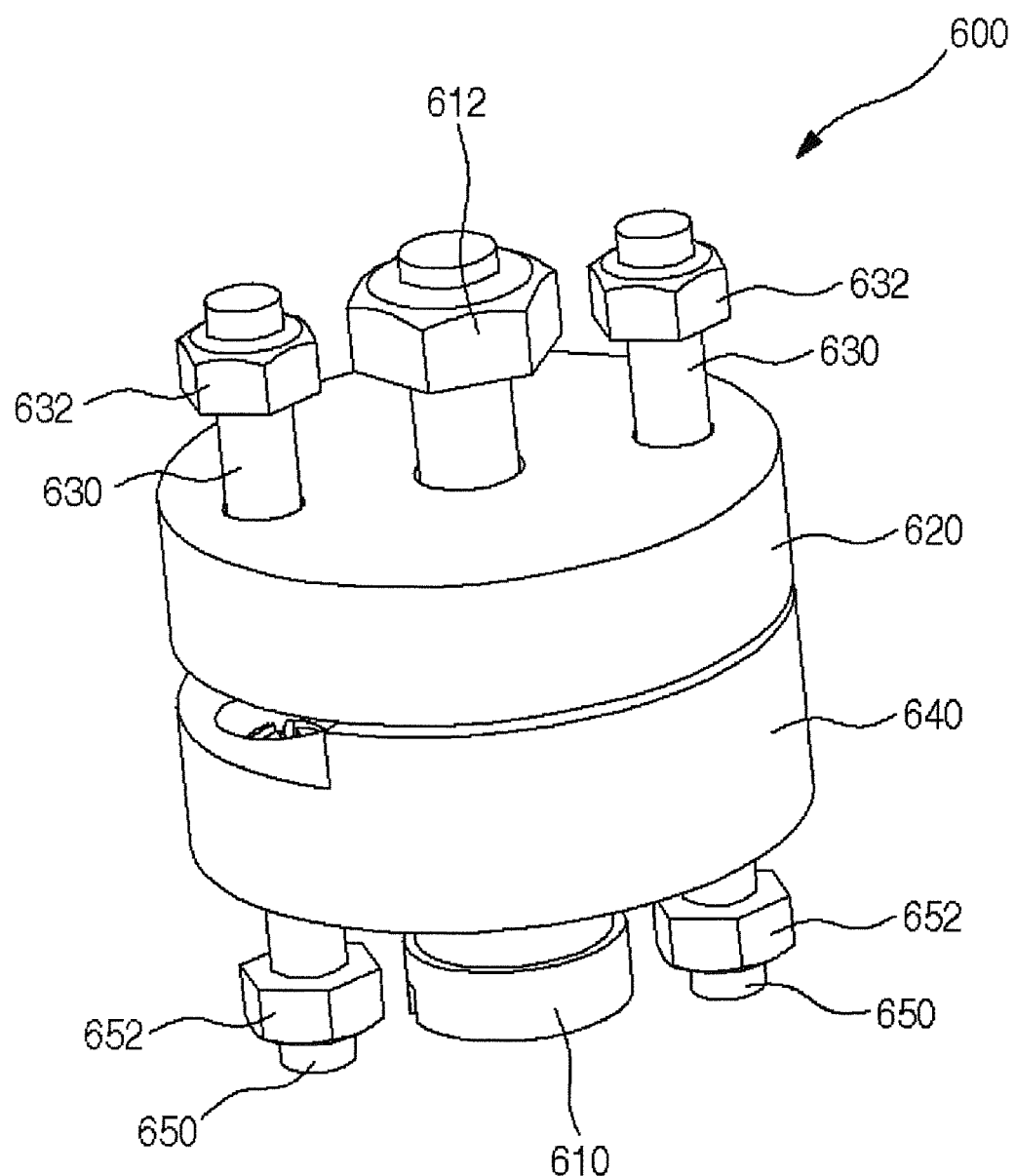
FIG. 7 is a perspective view showing the swing motion unit as the main component of the wind direction adjustable blade type vertical axis wind turbine according to the first embodiment of the present invention.
Figure 8:
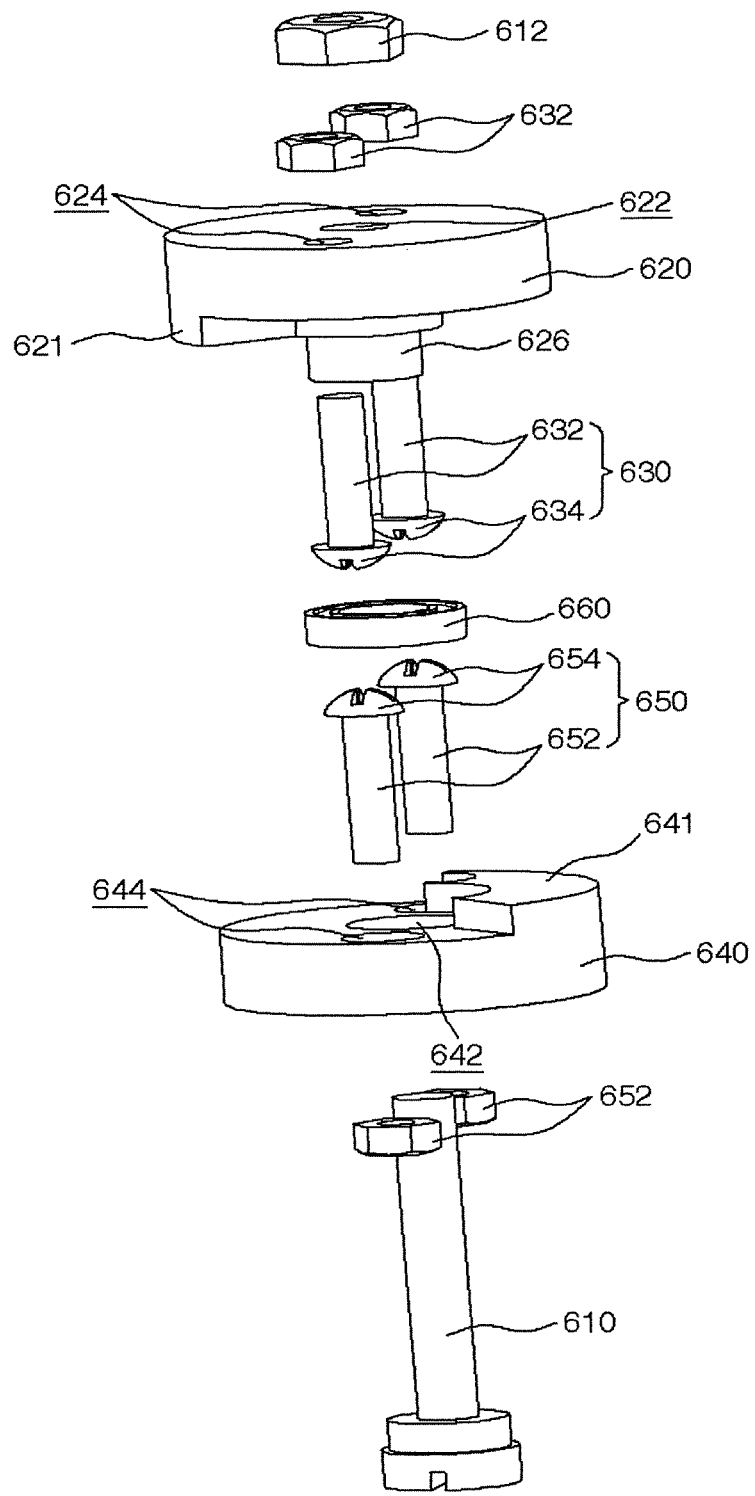
FIG. 8 is an exploded perspective view showing the swing motion unit of FIG. 7.
Figure 9:
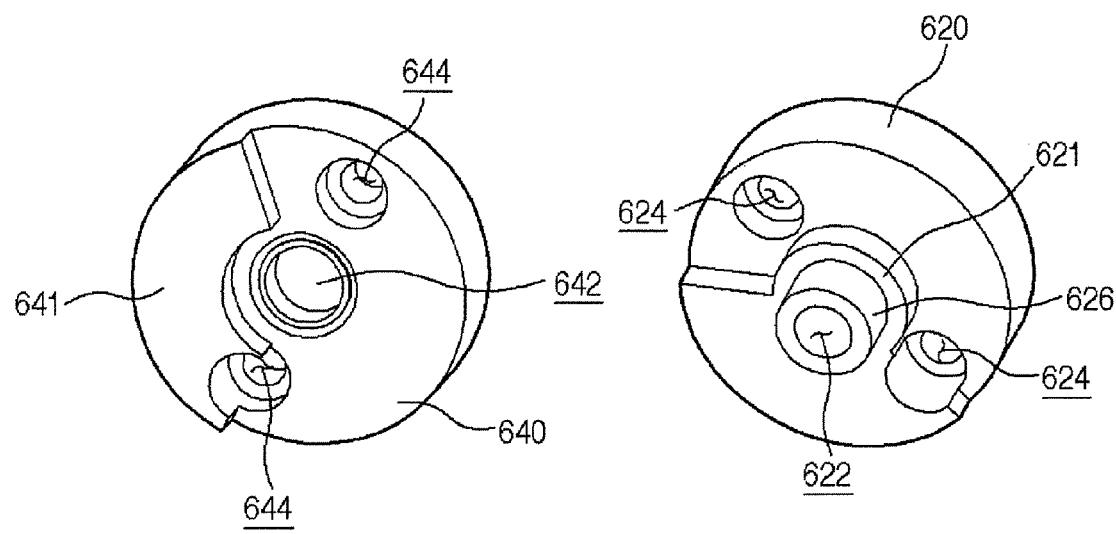
FIG. 9 is a perspective view showing the underside surface of an upper body and the top surface of a lower body as the main components of the swing motion unit according to the first embodiment of the present invention.
Figure 10:
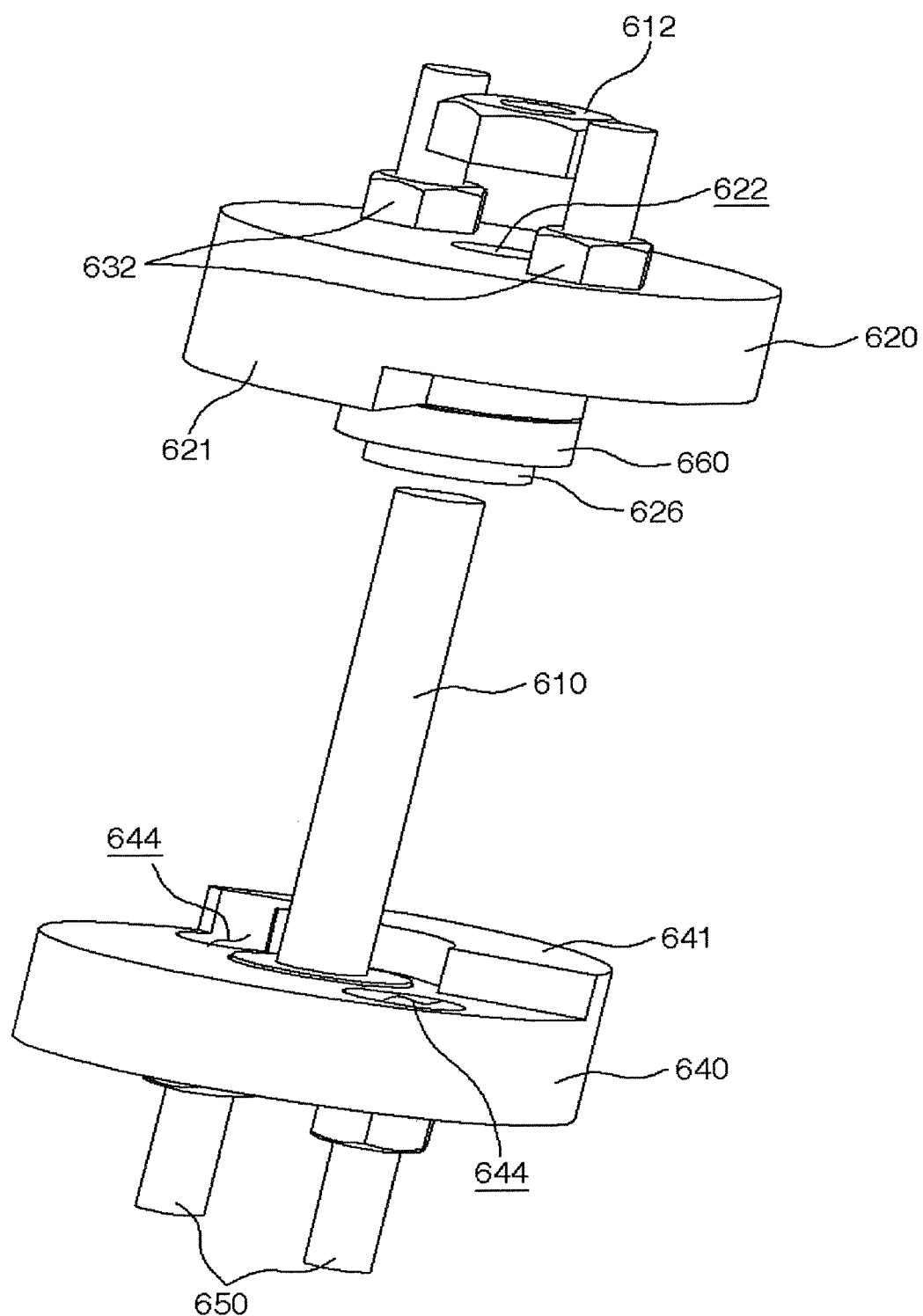
FIG. 10 is a perspective view showing the coupling structure between the upper body and the lower body of the swing motion unit according to the first embodiment of the present invention.

In more detail, FIG. 7 is a perspective view showing the swing motion unit as the main component of the wind direction adjustable blade type vertical axis wind turbine according to the first embodiment of the present invention, FIG. 8 is an exploded perspective view showing the swing motion unit of FIG. 7, FIG. 9 is a perspective view showing the underside surface of an upper body and the top surface of a lower body as the main components of the swing motion unit according to the first embodiment of the present invention, and FIG. 10 is a perspective view showing the coupling structure between the upper body and the lower body of the swing motion unit according to the first embodiment of the present invention.

Referring to FIGS. 1 to 10, each swing motion unit 600 is formed of two divided bodies fixed to respective different objects in the state of being laid on top of each other, and any one of the two bodies is rotatable together with the object fixed thereto.

For the convenience of the description, hereinafter, the first object is defined as the upper plate 100 or the blade 400 and the second object as the blade 400 or the lower plate 200 in accordance with the installation positions of the swing motion units 600.

That is, if the swing motion unit 600 is located at the top side of the blade 400, the first object becomes the upper plate 100 and the second object becomes the blade 400. Contrarily, if the swing motion unit 600 is located at the underside of the blade 400, the first object becomes the blade 400 and the second object becomes the lower plate 200. As a result, the swing motion unit 600 applied in the present invention connects two objects with each other, irrespective of the upper and lower portions of the first and second objects.

According to the preferred embodiment of the present invention, on the other hand, each swing motion unit 600 includes: a first body 620 adapted to be fixed to any one of the upper plate 100 or the lower plate 200 and the blade 400 and having a coupling portion 626 protruded therefrom; and a second body 640 adapted to be rotatably coupled to the coupling portion 626 of the first body 620 through a coupling hole 642 formed to correspond to the coupling portion 626 of the first body 620 and adapted to be fixed in a state of being coupled to the first body 620 to any one of the remaining components except any one of the upper plate 100 or the lower plate 200 and the blade 400 fixed to the first body 620.

Further, a main fixing shaft 610 is provided on the center portions of the first body 620 and the second body 640 in such a manner as to be passed through the coupling portion 627 and the coupling hole 642, while passing through the components coupledly fixed to the first body 620 and the second body 640, and a main fixing shaft bolt 612 is fastened to the main fixing shaft 610, thereby forming the center of rotation of any one of the fixed components.

According to the preferred embodiment of the present invention, that is, the main fixing shaft 610, which is passed through the swing motion unit mounting portions 440 formed on the top end of the blade 400, is passed through the coupling hole 642 and the coupling portion 626 and the blade top surface fixing portions 120 formed on the upper plate 100 and then fixed by means of the main fixing shaft bolt 612.

If the main fixing shaft 610 is fixed, accordingly, the blade 400 is rotatable around the main fixing shaft 610.

On the other hand, the first body 620 and the second body 640 have fixing holes formed on the left and right sides with respect to the position through which the main fixing shaft 619 is passed, and fixing shaft are inserted correspondingly into the fixing holes.

In more detail, the first body 620 has first body fixing shaft insertion holes 624 formed to fix the first body 620 to the object connected to the first body 620. Further, first body fixing shafts 630 are inserted into the first body fixing shaft insertion holes 624, and after that, if the end portions of the first body fixing shafts 630 are passed through the object to be connected to the first body 620, the exposed end portions are fastened to first body fixing shaft bolts to allow the first body 620 to be fixed to the object to be connected to the first body 620.

Each first body fixing shaft 630 has a first body fixing shaft head portion 634 having a relatively large sectional area and a first body fixing shaft body portion 632 having a relatively small sectional area. The first body fixing shaft body portion 632 has a screw groove formed thereon, thereby enabling screw fastening and unfastening.

Further, each first body fixing shaft insertion hole 624 has an outer peripheral portion having a relatively large diameter and an inner peripheral portion having a relatively small diameter with respect to the insertion direction of the first body fixing shaft 630 thereinto, so that only the first body fixing shaft body portion 632 is passed through all of the outer peripheral portion and the inner peripheral portion of the first body fixing shaft insertion hole 624, and the first body fixing shaft head portion 634 is accommodated inside the first body fixing shaft insertion hole 624.

In this case, the inner peripheral portion of the first body fixing shaft insertion hole 624 is formed at a position deeper than the length of the first body fixing shaft head portion 634 from the outer peripheral portion thereof, so that if the first body fixing shaft 630 is accommodated inside the first body fixing shaft insertion hole 624, the first body fixing shaft head portion 634 is not exposed to the outside of the first body 620.

On the other hand, the second body 640 has second body fixing shaft insertion holes 644 formed to fix the second body 640 to the object connected to the second body 640. Further, second body fixing shafts 650 are inserted into the second body fixing shaft insertion holes 644, and after that, if the end portions of the second body fixing shafts 650 are passed through the object to be connected to the second body 640, the exposed end portions are fastened to second body fixing shaft bolts to allow the second body 640 to be fixed to the object to be connected to the second body 640.

Each second body fixing shaft 650 has a second body fixing shaft head portion 654 having a relatively large sectional area and a second body fixing shaft body portion 652 having a relatively small sectional area. The second body fixing shaft body portion 652 has a screw groove formed thereon, thereby enabling screw fastening and unfastening.

Further, each second body fixing shaft insertion hole 644 has an outer peripheral portion having a relatively large diameter and an inner peripheral portion having a relatively small diameter with respect to the insertion direction of the second body fixing shaft 650 thereinto, so that only the second body fixing shaft body portion 652 is passed through all of the outer peripheral portion and the inner peripheral portion of the second body fixing shaft insertion hole 644, and the second body fixing shaft head portion 654 is accommodated inside the second body fixing shaft insertion hole 644.

In this case, the inner peripheral portions of the second body fixing shaft insertion holes 644 are formed at the positions deeper than the lengths of the second body fixing shaft head portions 654 from the outer peripheral portions thereof, so that if the second body fixing shafts 650 are accommodated inside the second body fixing shaft insertion holes 644, the second body fixing shaft head portions 654 are not exposed to the outside of the second body 640.

That is, in the state where one sides of the first body fixing shafts 630 and the second body fixing shafts 650 are inserted into the first body 620 and the second body 640, the other sides thereof are exposed to the outside of the objects to be connected to the first body 620 and the second body 640 and are fixed to the first body 620 and the second body 640 by means of fastening members like bolts. Accordingly, even though the first body 620 and the second body 640 are fastenedly rotated, no interference caused by the respective fixing shafts occurs.

On the other hand, the first body 620 has a first body stopper 621 formed protrudingly therefrom toward the second body 640, and the second body 640 has a second body stopper 641 formed protrudingly therefrom toward the first body 620.

In this case, the first body stopper 621 and the second body stopper 641 interfere with each other if the first body 620 and the second body 640 are fastenedly engaged with each other, thereby restricting the rotating range. Accordingly, the first body stopper 621 and the second body stopper 641 have the same protruding lengths as each other and the sizes on less than half of the whole sectional area determined in accordance with the rotating range.

The first body 620 further includes a bearing 660 mounted along the coupling portion 626 to enable the first body 620 and the second body 640 to be gently rotated.

That is, the first body 620 and the second body 640 are point contacted with each other, not surface-contacted with each other, by means of the bearing 660, thereby reducing the frictional resistance.

On the other hand, the swing motion unit 600 constructed as mentioned above is disposed on the top and bottom sides of each blade 400 of the wind turbine 1 according to the present invention, respectively, so that the blade 400 is rotatable to a given angle between the upper plate 100 and the lower plate 200.

Additionally, the blade 400 has the portion to which the wind is more effectively collected and the portion through which the wind is avoided to reduce the rotational resistance in accordance with the rotational position of the wind turbine 1 and the wind direction.

Figure 11:
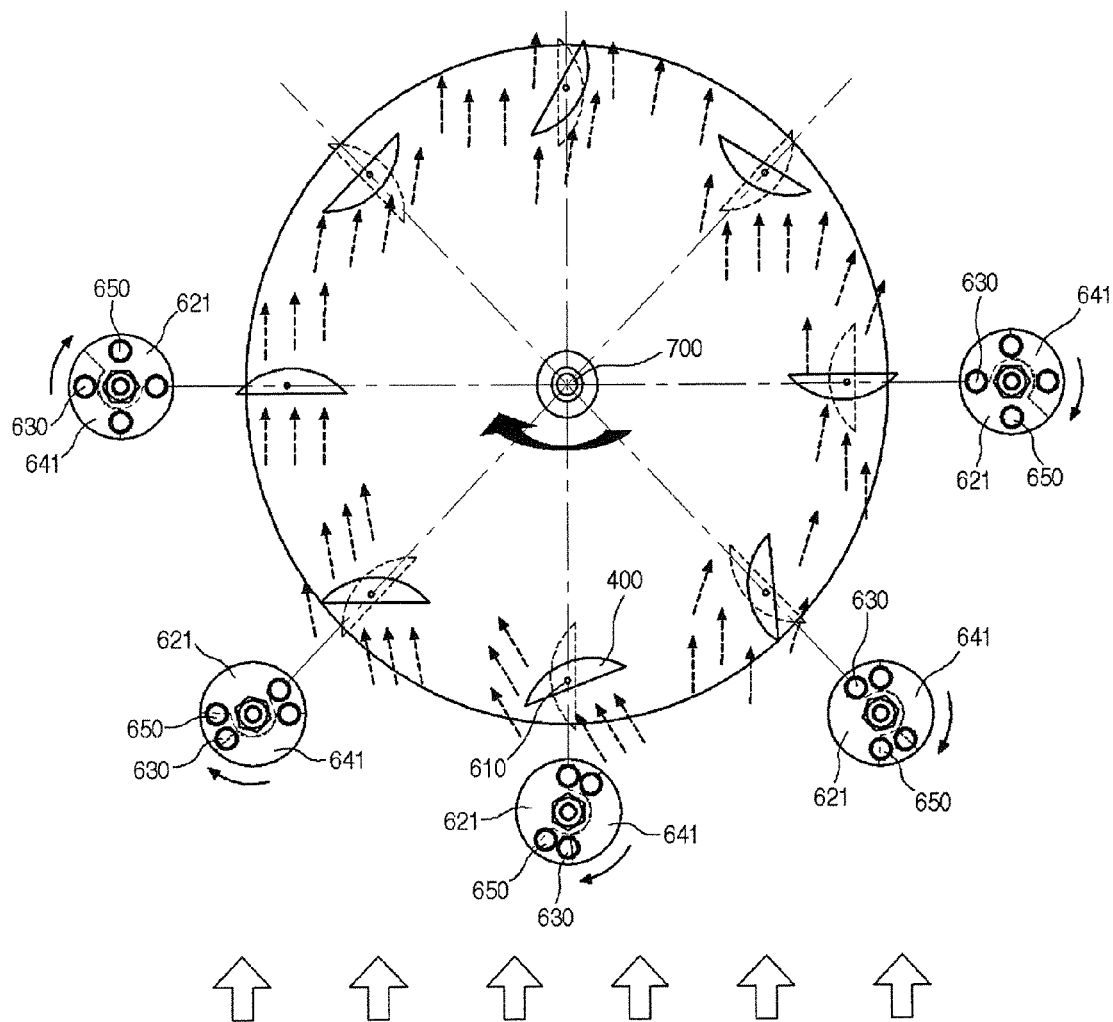
FIG. 11 is an exemplary view showing the blades swung by wind in the wind direction adjustable blade type vertical axis wind turbine according to the first embodiment of the present invention.

FIG. 11 is an exemplary view showing the blades swung by wind in the wind direction adjustable blade type vertical axis wind turbine according to the first embodiment of the present invention, wherein the positions at which the blades 400 are initially disposed are indicated by dotted lines, and the positions of the blades 400 rotated by wind are by solid lines.

At the positions where the collection portions 420 are first contacted with the wind around the rotating shaft 700 of the wind turbine 1, as shown in FIG. 11, the blades 400 are rotated in a direction where wind is much more collected. That is, the first bodies 620 of the swing motion units 600 fixed to the upper plate 100 by means of the respective first body fixing shafts 630 are changed in positions by means of the rotation of the upper plate 100, as shown.

On the other hand, if the positions of the first bodies 620 of the swing motion units 600 are changed, the second bodies of the swing motion units 600 rotatably coupled to the blades 400 are freely swung within the rotational radius restricted by means of the first body stoppers 621 and the second body stoppers 641 in accordance with the wind direction, thereby collecting or avoiding the wind power.

According to the present invention, that is, if the blades 400 are located in a direction where the wind increases the rotary force, they are rotated to allow the collection portions 420 to be fully exposed to the wind, thereby increasing the rotary forces, and contrarily, if the blades 400 are located in a direction where the wind is acted as the rotational resistance, they are rotated to allow the avoidance portions 410 to be fully exposed to the wind, thereby decreasing the rotational resistance.

In more detail, at the positions where the avoidance portions 410 of the blades 400 are first contacted with the wind, the blades 400 are rotated to allow the wind to be easily sent along the avoidance portions 410. At this time, since the second bodies 640 are fastened to the blades 400 and contacted with the first bodies 620 fixed to the upper plate 100 in the state of being reduced in the frictional resistance through the bearing 660, the blades 400 are gently rotated to avoid the wind power.

To the contrary, at the positions where the collection portions 420 of the blades 400 are first contacted with the wind, the blades 400 are rotated to allow the wind to be much more contacted with the collection portions 420, thereby fully collecting the wind power. Further, the rotation of the blades 400 is allowed within the range of the rotational limitation formed by means of the contact between the first body stoppers 621 and the second body stoppers 641, and of course, the shapes of the first body stoppers 621 and the second body stoppers 641 are varied to change the rotational ranges of the blades 400.

Accordingly, the angles of the blades 400 are varied at even places where wind quantity is low in accordance with the structures of the swing motion units 600 and the coupling relation between the blades 400 and the upper/lower plates 100 and 200, thereby making efficient use of the wind power and reducing the rotational resistance.

On the other hand, the blades 400 may be located in a plurality rows.

Figure 12:
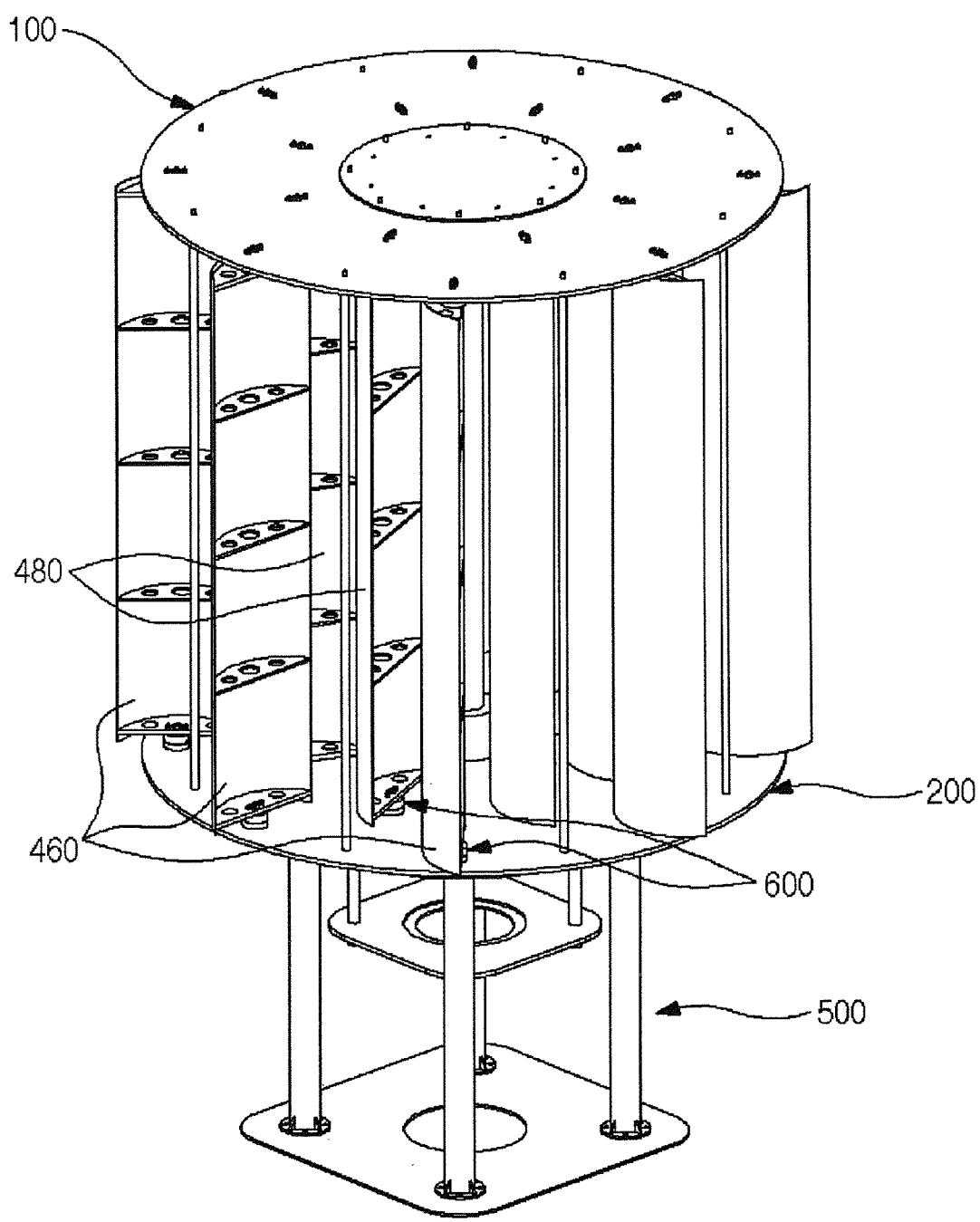
FIG. 12 is a perspective view showing a wind direction adjustable blade type vertical axis wind turbine according to a second embodiment of the present invention.
Figure 13:
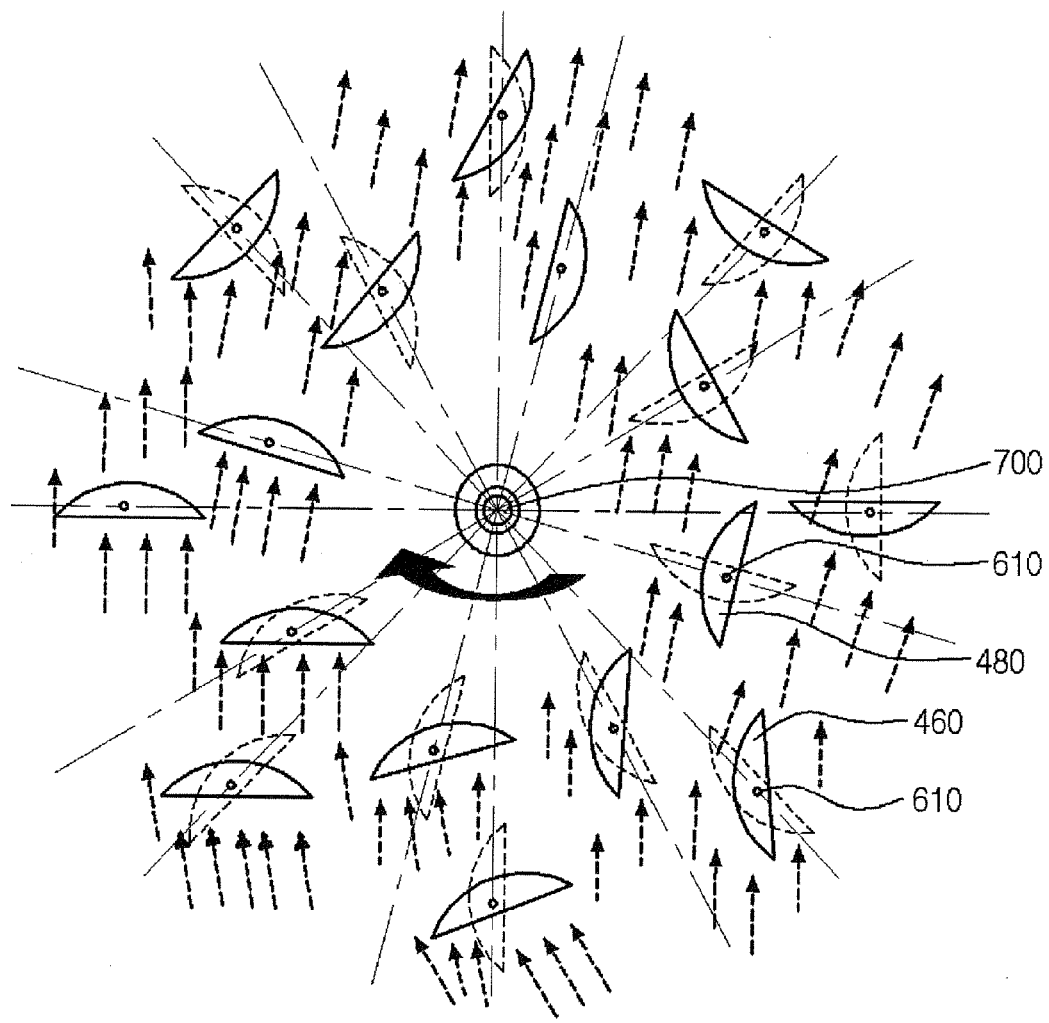
FIG. 13 is an exemplary view showing the blades swung by wind in the wind direction adjustable blade type vertical axis wind turbine according to the second embodiment of the present invention.
Figure 13:
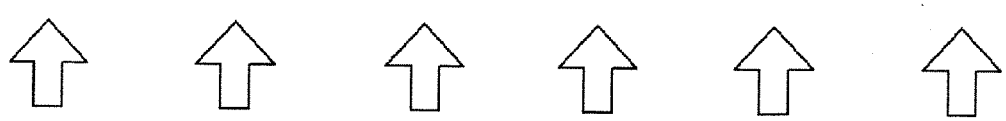

FIG. 12 is a perspective view showing a wind direction adjustable blade type vertical axis wind turbine according to a second embodiment of the present invention, and FIG. 13 is an exemplary view showing the blades swung by wind in the wind direction adjustable blade type vertical axis wind turbine according to the second embodiment of the present invention.

According to the second embodiment of the present invention, as shown in FIGS. 12 and 13, blades are arranged in a plurality rows.

According to the second embodiment of the present invention, in more detail, a plurality of outside blades 480 is located along the outer peripheral portions of the upper plate 100 and the lower plate 200, and a plurality of inside blades 460 is located between the outside blades 480 and the rotating shaft 700.

In the same manner as in the first embodiment of the present invention, the outside blades 480 and the inside blades 460 are coupled on the top and underside thereof to the swing motion units 600 and rotatably fixed thereto.

On the other hand, the outside blades 480 and the inside blades 460 are located in such a manner as to be not overlapped with each other when the rotating shaft 700 and the center of rotation of each blade are connected to each other.

That is, it is desirable that the outside blades 480 and the inside blades 460 are located in a zigzag manner to allow the wind blowing between the adjacent outside blades 480 to be collected to the inside blades 460 and utilized as the rotary forces.

In the same manner as in the first embodiment of the present invention, if the blades 480 and 460 are located in a direction where the wind increases the rotary forces, they are rotated to allow the collection portions 420 to be fully exposed to the wind, thereby increasing the rotary forces, and contrarily, if the blades 480 and 460 are located in a direction where the wind is acted as the rotational resistance, they are rotated to allow the avoidance portions 410 to be fully exposed to the wind, thereby decreasing the rotational resistance.

Accordingly, if the wind turbine according to the present invention is connected to the generating unit, the number of blades installed and the arrangement manner thereof are varied easily through a simple installation configuration, and unlike existing wind power generators, further, the restriction of the installation position of the wind turbine in accordance with the wind quantity is avoided. Additionally, the wind turbine according to the present invention improves the generating efficiency.

As described above, the wind direction adjustable blade type vertical axis wind turbine according to the present invention includes the blades rotatably disposed to a given range. Each blade has a shape of an arc, which serves as the collection portion adapted to concentratedly collect wind and as the avoidance portion to avoid wind and reduce the rotational resistance in accordance with the rotation position and the wind direction. Accordingly, the wind turbine according to the present invention advantageously makes efficient use of the wind.

Moreover, the blades are fixed by means of the swing motion units each having the first body and the second body rotatably engaged with each other, and the swing motion units form the rotating shafts on the blades and restrict the rotational range through the stoppers formed on the respective bodies. Accordingly, the blades are rotated to the rotational angles different from each other, thereby more effectively utilizing the wind power.

Furthermore, the first body and the second body of each swing motion unit are fixed by means of the respective fixing shafts to the objects to be connected, and they have a single assembly through the main fixing shaft, so that they may be readily assembled and disassembled and further fastened easily to the objects to be connected.

Additionally, if the wind turbine according to the present invention is connected to the generating unit, the number of blades installed and the arrangement manner thereof are varied easily through a simple installation configuration, and unlike existing wind power generators, further, the restriction of the installation position of the wind turbine in accordance with the wind quantity is avoided. Additionally, the wind turbine according to the present invention improves the generating efficiency.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A wind direction adjustable blade type vertical axis wind turbine comprising:
   a rotating shaft (700) adapted to be rotated by means of wind power;
   an upper plate (100) adapted to be coupled to the upper portion of the rotating shaft (700);
   a lower plate (200) adapted to be coupled to the lower portion of the rotating shaft (700);
   one or more blades (400) disposed between the upper plate (100) and the lower plate (200) in such a manner as to be coupled to at least one or more sides of the upper plate (100) and the lower plate (200) by means of swing motion units (600) connecting to the upper plate (100) and the lower plate (200) and to be rotatable around center shafts of rotation of the swing motion units (600) in accordance with wind direction;
   a generating unit connected to the rotating shaft (700); and
   an accelerating unit (800) disposed between the rotating shaft (700) and the generating unit to accelerate the rotary force, the accelerating unit (800) comprising: a connection rod adapted to be coupled to the rotating shaft (700) to receive the rotary force from the rotating shaft (700); a plate (820) rotatably fastened to the connection rod; a plurality of planet gears (870) rotated by receiving the rotary force of the plate (820); a sun gear (850) located among the planet gears (870) in such a manner as to be rotatably engaged with the planet gears (870) to transmit the rotary force to the generating unit; and a ring gear (860) disposed to surround the planet gears (870) in such a manner as to allow the planet gears (870) and the sun gear (850) to be rotated at a high speed at their fixed position,
   wherein each swing motion unit (600) comprises:

a first body (620) adapted to be fixed to the upper plate (100) or the lower plate;

a second body (640) adapted to be fixed to each blade (400) in such a manner as to be rotatably coupled engagedly to the first body (620); and a main fixing shaft (610) provided on center portions of the first body (620) and the second body (640) so as to form a center of rotation of the first body (620), the second body (640), and the swing motion unit (600), the first body (620) and the second body (640) having stoppers (621) and (641) formed protrudingly therefrom in the opposite direction to each other in such a manner as to interfere with each other if the blade (400) is rotated, thereby restricting the rotating range and transmitting the wind power provided to the blade (400) to the rotating shaft (700), so that the blades (400) are rotated to rotational angles different from each other, thereby more effectively utilizing the wind power.

2. The wind direction adjustable blade type vertical axis wind turbine according to claim 1, wherein each blade (400) has an arch-shaped section having a given radius in a vertical direction with respect to the rotating shaft (700).

3. The wind direction adjustable blade type vertical axis wind turbine according to claim 1, wherein each blade (400) comprises: a collection portion (420) formed on one side surface thereof to collect wind power; and an avoidance portion (410) formed on the other side surface thereof in such a manner as to reduce the resistance against the wind power.

4. The wind direction adjustable blade type vertical axis wind turbine according to claim 1, wherein the blades (400) comprise: one or more outside blades (480) located along the outer peripheral portions of the upper plate (100) and the lower plate (200); and one or more inside blades (460) located between the outside blades (480) and the rotating shaft (700).

* * * * *